UNITED STATES PATENT OFFICE.

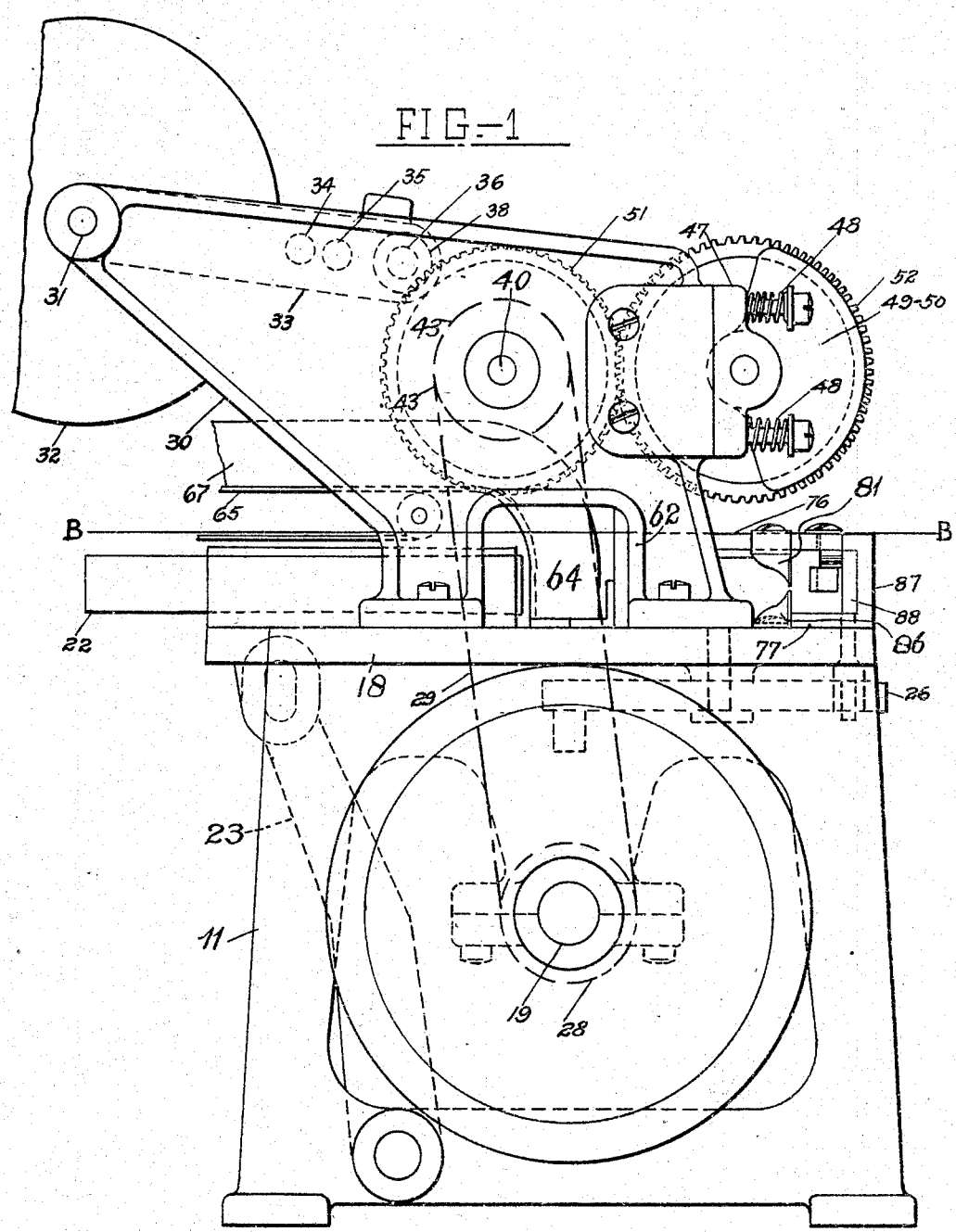

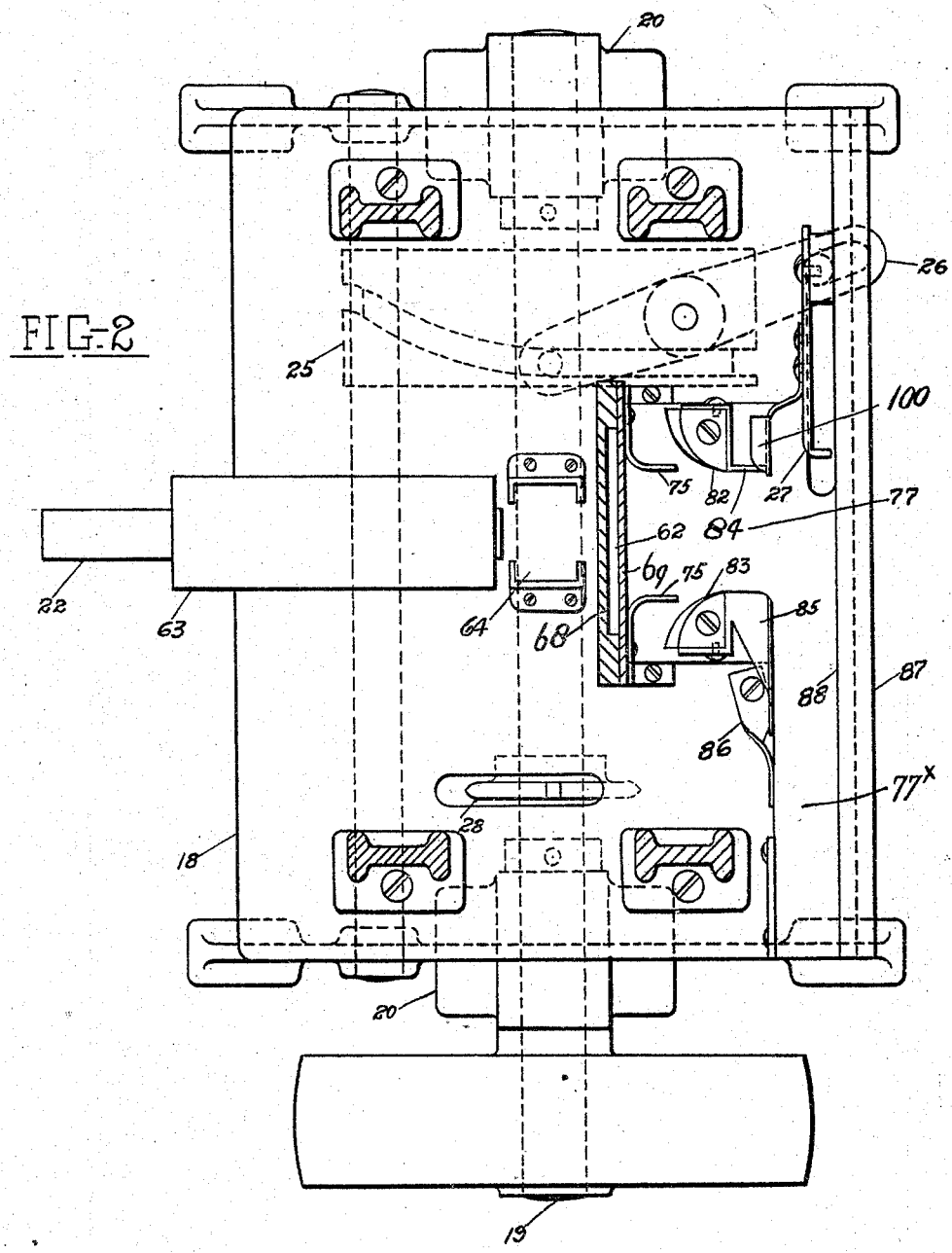

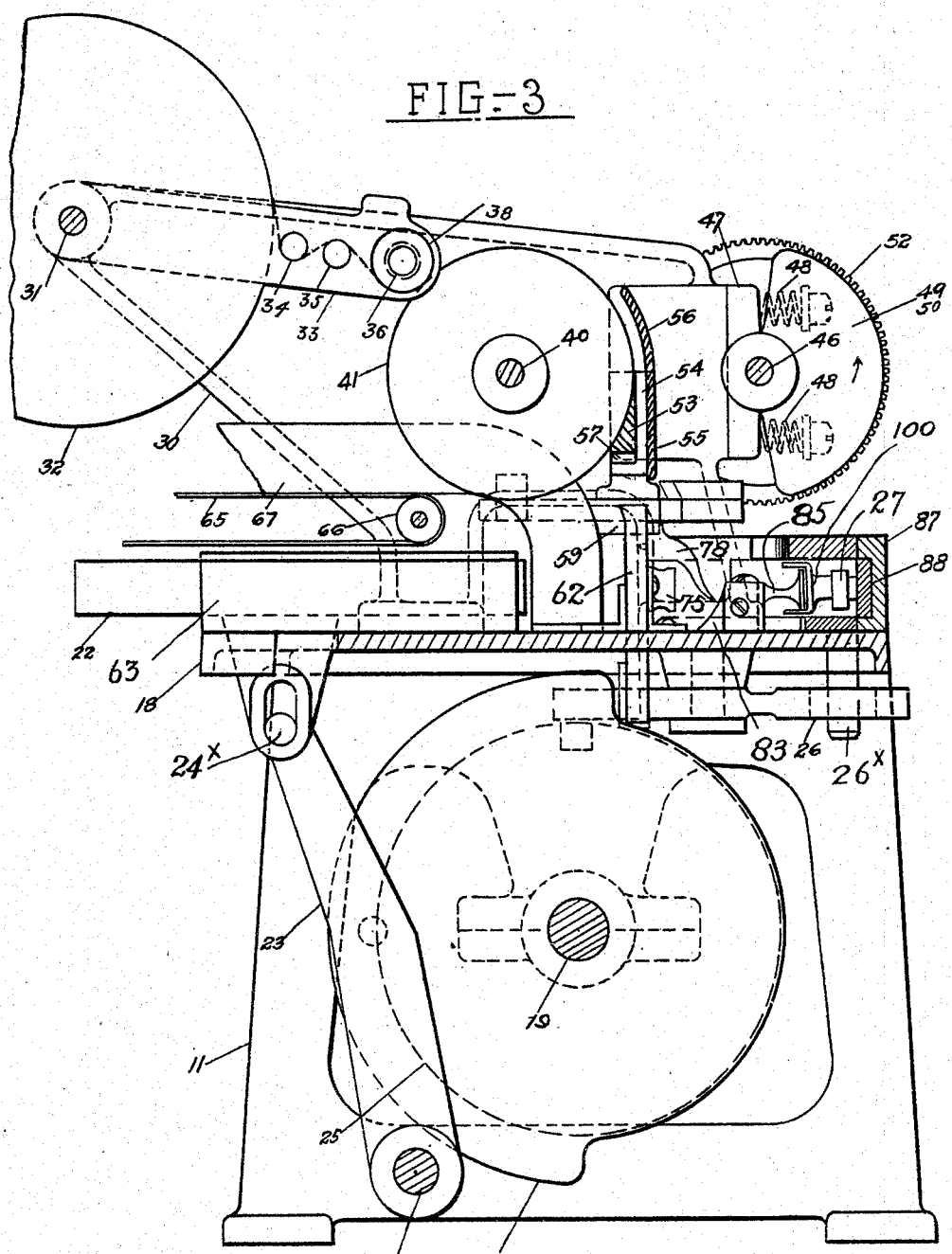

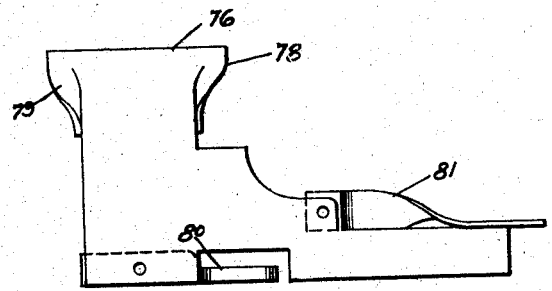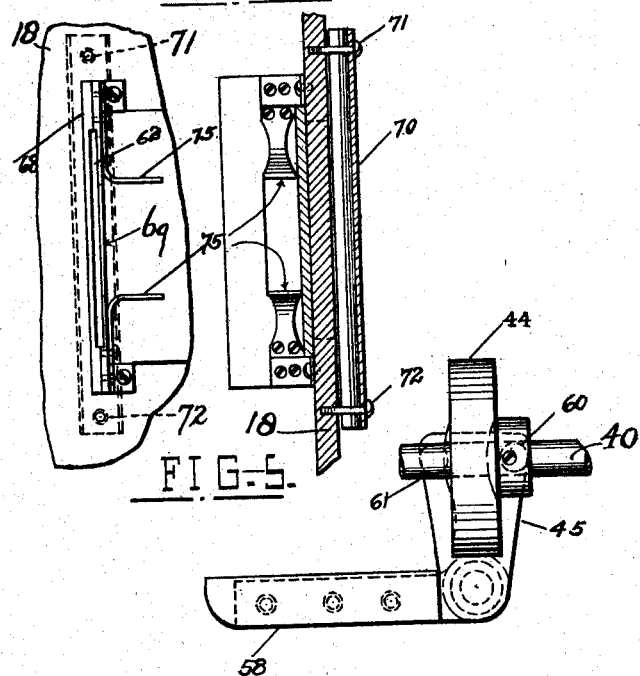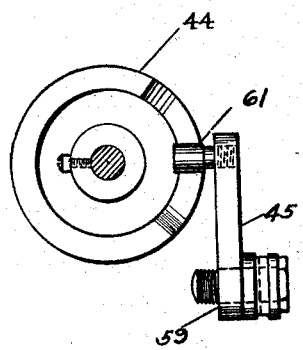

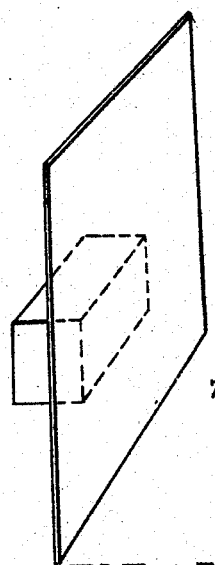
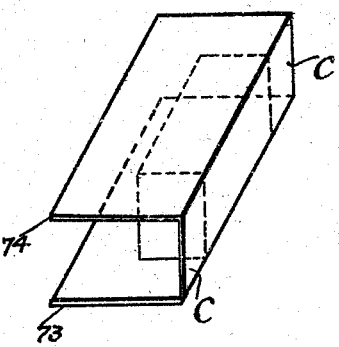
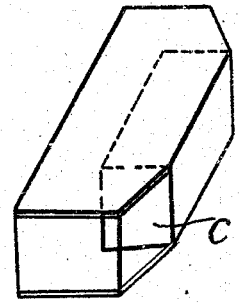
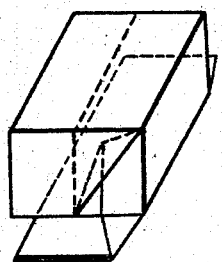
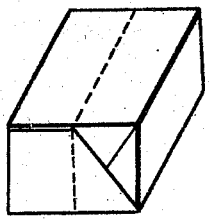
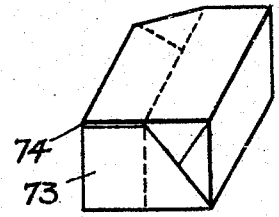
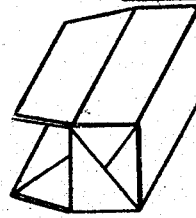
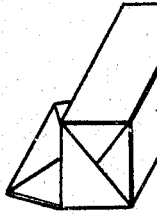
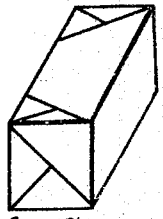

THEODORE G. McGIRR, OF NEW YORK, N. Y., ASSIGNOR TO ACME WRAPPING MACHINE COMPANY, OF NEW YORK, N. Y., A CORPORATION OF NEW YORK.

WRAPPING-MACHINE.

949,802.       Specification of Letters Patent.     Patented Feb. 22, 1910.

Application filed February 2, 1909. Serial No. 475,688.

*To all whom it may concern:*

Be it known that I, THEODORE G. McGIRR, a citizen of the United States, and residing in the city, county, and State of New York, have invented an Improvement in Wrapping-Machines, of which the following is a specification.

My invention relates to machines for wrapping articles in papers or other covers, and has for its primary object the provision of simple and durable means for advancing the article to be wrapped, the paper in which it is wrapped and the folding, tucking and laying of the cover about the article.

Another object is to secure a higher rate of speed in wrapping the articles, and the avoidance of defects existing in the prior machines.

Other objects will appear hereinafter.

My invention consists of features of construction, arrangements and combinations of devices hereinafter described and more particularly pointed out in the appended claims.

My invention is embodied in the machine illustrated in the accompanying drawings, forming part of this specification, in which—

Figure 1 is a side elevation of the machine; Fig. 2 is a plan view partly in section on the plane B—B of Fig. 1; Fig. 3 is a vertical sectional view of the machine taken inside the side-frame of Fig. 2; Fig. 4 is a view from underneath of a part of the upper folder; Fig. 5 is a view from above and also from the front of the first pair of folders; Fig. 6 embraces a plan and a side view of a cutter and operating mechanism therefor; Fig. 7 is a diagrammatic view illustrating the beginning of the wrapping operation; Figs. 8, 9, 10, 11, 12, 13, 14 and 15 are diagrammatic views illustrative of the various steps or stages in the process of wrapping an article; and Fig. 16 is a perspective view of the wrapped article.

In the drawing, the reference numeral 11 marks legs for supporting a table 18 and the reference 30 designates two uprights or standards bolted or otherwise secured to the platform or table 18. Beneath the table 18 and suitably mounted in bearings connected with the side frames or legs 11, is a main drive-shaft 19 journaled in bearings 20. A cam 21 is secured to the shaft 19 and is arranged to operate the plunger 22, which slides in a housing or bearing 63 attached to the said platform 18 through a connection between the said cam 21 and the said plunger 22 consisting of a lever 23 which is fulcrumed at 24 and which is connected with the plunger by means of a slot and pin $24^x$. The shaft 19 is also provided with a cam 25 for operating the plunger 27, the cam 25 operating on a lever 26, which lever is connected by a slot and a pin $26^x$ with the slide or plunger 27. The plunger 27 moves at right angles to the direction of motion of the plunger 22 aforesaid and in the same plane on top of the platform 18.

The reference 31 marks a rod or shaft removably mounted in bearings in the side frames 30; the said rod or shaft 31 forming a bearing for a roll of paper 32. At each side of the roll 32 and attached to the rod 31 is an arm 33, the said arms extending forward from said shaft to a point adjacent to the guide roll 41. The said arms are connected together by rods or ties 34, 35, 36 and the outer rod 36 has loosely mounted thereon two rolls 38, 39, which coact with the roller or rollers 41, to feed the paper forward. As indicated in Fig. 3, the paper passes beneath the rod 34, over the rod 35 and under the rolls 38, 39 and over the rolls 41 and down through the throatway 62. The rolls 41 are loosely mounted on a shaft 40 which is journaled in the side frames 30 aforesaid. The shaft 40 has a gear wheel 51 and a sprocket wheel or pulley 43 fast thereon, while the shaft 19 aforesaid has a corresponding sprocket wheel or pulley 28 fast to it, and the said sprocket wheels or pulley are connected by the sprocket chain or belt 29, whereby the shaft 40 is driven from the shaft 19.

In front of the shaft 40 and roll 41 is a bar 53 for connecting the side frames 30, and this bar 53 at a point in front of the roll 41 forms part of a throatway or guide 54 through which the paper 32 passes on its way to the throatway 62, there being a plate 55 in front of the bar 53 and provided with a backwardly curved tongue or guide 56, to form the front wall of said throatway 54. Underneath the bar 53 is an adjustable blade 57 whose lower edge forms a cutter coacting with the knife 58 now to be described.

At one side of the said throatway 54 is suitably journaled a rocking arm or bell-lever 45 which has rollers 60, 61 thereon for coaction with a cam 44 on the shaft 40. The blade 58 is adjustably secured to an arm of the bell-lever 45 and coacts with the cutter 57 to sever the paper into proper lengths.

The web of paper is intermittently advanced by means of the circular segments 49, 50 fast on a shaft 46 journaled in bearings attached to the side frames 30 aforesaid. The shaft 46 is provided with a gear 52, fast thereon, which meshes with and is driven by the gear 51 aforesaid. The shaft 46 is journaled in bearings 47 which are movable with respect to the side frames 30 and which are held there against by the screw bolts and springs 48, thereby giving a yielding pressure between the segment disks 49, 50 and the roller or rollers 41. The paper is gripped between the rollers 41 and the segment rollers 49, 50 and is fed forward as long as these are in contact with each other and no longer.

The articles $a$ are placed in the guideway 67 which is bent down in front of the plunger 22 at 64. This guideway is cut away at the front and back to allow the plunger 22 to pass through to push the article therefrom. The articles in the guideway 67 are fed forward by means of a belt 65 running on pulleys 66, the said belt acting on the articles $a$ from underneath, as indicated in Fig. 3. The throatway 62 is also cut away to allow the plunger 22 to move the articles through the said throatway 62, but the sides of the throatway 62 are channeled to guide the wrapping paper to a point below the platform 18, whereby the article $a$, as it is pushed from the chute 64, will impinge against the paper at about the center thereof as indicated in Fig. 7. The throatway 62 is composed of a rear plate 68 and a front plate 69 and these are attached to the platform 18 by brackets and screws or otherwise. The lower edge of the paper passes through a slot in the table 18 and is arrested by the V-shaped stop 70 which is held in place by the adjustable screws 71, 72, the function of the stop 70 being to arrest the paper in the proper position for the beginning of the operation of wrapping as the plunger 22 moves the article forward. As the plunger 22 moves the article forward from the position illustrated in Fig. 7, the paper is turned down to the position thereof shown in Fig. 8, by the top and bottom of the slot in the throatway 62, the reference 73 indicating the lower flap and the reference 74 the upper flap of the paper. As the plunger 22 continues its motion, the article is forced between the tucker fingers 75, which turn in the middle portions $c$ of what may be termed the "ends" of the wrapper, to the positions thereof shown in Fig. 9.

Immediately in front of the paper throatway 62 are two plates 76, 77, the upper plate 76 of which is provided with flaring scrolls 78, 79, which, during the advance of the article toward the front of the machine, turn down the ends of the top flap 74 from the position thereof shown in Fig. 9 to the position thereof shown in Fig. 10. The said plate 76 has an extension at right angles to that portion which carries the above mentioned scrolls and such right angle portion is provided with a spring finger 80, the function of which is to hold the article and its partially folded wrapper in position while undergoing further wrapping operations. The said plate 76 has also secured thereto a spring scroll or finger 81. The lower plate 77 has secured thereto scrolls or folders 82, 83 which are adjusted in rear of the scrolls 78, 79 and act to turn up the ends of the lower flap 73 from the position thereof shown in Fig. 10 to the position thereof shown in Fig. 11. The said scroll 82 has attached thereto a flat spring 84 which holds the partially folded wrapper in position at the end of the stroke of the plunger 22 so that the article and the wrapper may be operated upon by the second plunger 27. The scroll 83 has attached thereto a supplemental tucker 85 which, as the plunger 27 is operated, acts on the projecting overlapping folded-in front ends of the flaps 73, 74 (see Fig. 12) and turns them in from the position thereof indicated in Fig. 12 to the position shown in Fig. 13, as said plunger 27 moves the article onward. As the plunger 27 comes forward, the tucker 100 which is attached thereto, tucks in the overlapping ends of the flaps 73, 74 from the position thereof shown in Fig. 11 to the position thereof indicated in Fig. 12, corresponding to the turning-in done by the tucker 85 aforesaid. The plunger 27 is attached to a bar 88 which works in the guideway 87 in front of the machine. The plate 77 has an extension 77× to which is attached a scroll 86. As the plunger 27 continues its advance motion, the scroll 81 above described turns down the remainder of the flap 74 from the position thereof shown in Fig. 13 to that indicated in Fig. 14 and during the further advance the scroll 86 turns up the last portion of the lower flap 73 from the position thereof shown in Fig. 14 to the position thereof indicated in Fig. 15, thus completing the wrapping of the article. The plunger 27 has a motion substantially equal to the length or width of the article, so that each article pushes its predecessor ahead of it and thereby causes the folding operation above described to take place. The spring 80 retains the articles released by the plunger 27 the moment the said plunger begins its reverse or return motion.

The machine above described is simple in construction and operation and is small and compact.

While the tucker 100 is shown and described as being attached to the plunger 27, it will be understood that such construction is merely a convenient one and that the two may operate separately without departing from this invention. Other re-arrangements or modifications may be made without departing from the scope of this invention as defined by the claims herein.

The operation of the machine has been indicated during the progress of the description of the component parts thereof but a synopsis of it follows: The articles to be wrapped are fed forward by the belt 65 and are guided down into the chute 64 and are held therein by their ends except that the lowest article of all may be pushed from underneath the remainder by means of the plunger 22 over against the paper as indicated in Fig. 7 which paper has previously been severed from the roll of web by the knife 58 and which stands upright in the chute or throatway 62. The further advance of the plunger 22 toward the front of the machine folds the paper about the article as indicated in Fig. 6, as said paper passes through the opening beneath the bottom plate 77 and the back plate 68, and thereafter the curved fingers or tuckers 75 fold in the center end sections c of the overhanging flaps 73, 74 (see Fig. 9) and thereafter the scrolls 78, 79 fold down the ends of the top flaps 74 as indicated in Fig. 10 after which the scrolls 82, 83 fold up the ends of the flaps 73 as indicated in Fig. 11 and as this operation is completed, the article has been removed to a position directly in front of the plunger 27, which thereafter advances and the tucker 100 folds in the doubled-up or two-ply ends of the flaps 73, 74, as indicated in Fig. 12. The plunger 27 advances farther and forces the article by the tucker 85, which tucker folds in the two-ply or doubled ends of flaps 73, 74 at the leading end of the article, as indicated in Fig. 13, after which the scroll 81 folds down the upper flap 74 as indicated in Fig. 14, leaving what remains of the flap 73 extended as shown in Fig. 14, and thereafter the scroll 86 lifts the flap 73 from the position thereof shown in Fig. 14 up against the side of the article as indicated in Fig. 15. It will be understood that the plunger 27 does not move the articles the full distance required by the operation above described but that the succeeding articles advance those ahead and cause certain of the operations to be performed. The articles wrapped as shown in Fig. 16, are pushed out at the left of the front of the machine (lower side of Fig. 2) into a suitable receptacle.

The scrolls hereinbefore mentioned are in the nature of helical or warped surfaces, and have what may be called their leading ends parallel with the flap to be moved, so that they begin to act upon the flaps 74 or 73 at all points of its width and gradually turn the front edge of the flap over against the side of the article; this is equally true whether the scrolls act at the end of the article or at its side.

What I claim as new is:—

1. In a wrapping machine, the combination of article feeding and wrapper feeding mechanisms, a plunger and folding devices for folding the wrapper about the front, top, bottom and ends of the article as said plunger advances it, a second plunger operating at right angles to the first, a tucker attached to said second named plunger for folding the rear end of the wrapper upon the article and folding devices to fold in the other end of the wrapper and the flaps thereof to inclose the remaining side of the article.

2. In a wrapping machine the combination of a plunger for advancing the article, means for interposing wrappers in the path of the article moved by said plunger, adjustable means for arresting said wrappers in said path, folders along the sides of said path for laying the wrapper upon the front, top, bottom and ends of the article, a second plunger operating at right angles to the first plunger, a tucker carried by said second plunger for folding in the rear ends of said wrapper and folding devices in the path of the article as moved by said second plunger for completing the laying of the wrapper about the article.

3. In a wrapping machine, the combination of two plungers operating at right angles to each other, folding devices for partially folding the wrapper about said article as the latter is advanced by one plunger, a spring forming a continuation of one of said folding devices for holding the wrapper in contact with the article until the second plunger advances and a second set of folders for completing the wrapping of the article as the second plunger advances the same.

In witness whereof I have hereunto set my hand in the presence of two subscribing witnesses.

THEODORE G. McGIRR.

Witnesses:
R. W. BAEKLEY,
SAMUEL S. WATSON.